May 7, 1935.　　　W. W. EITEL ET AL　　　2,000,560
THERMIONIC TUBE STEM MACHINE
Filed Dec. 11, 1933
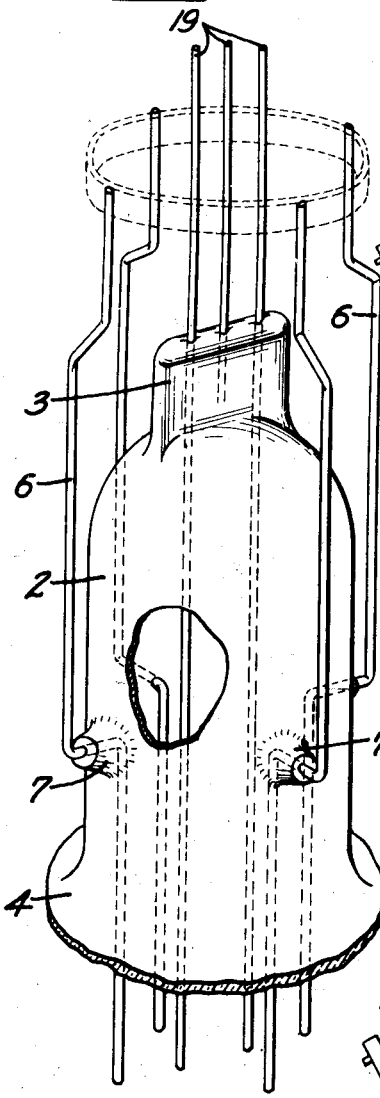
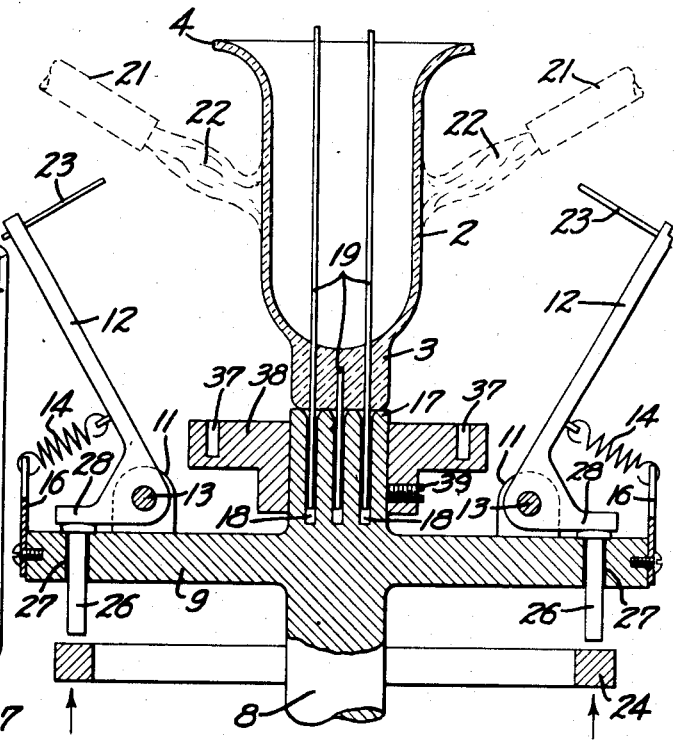
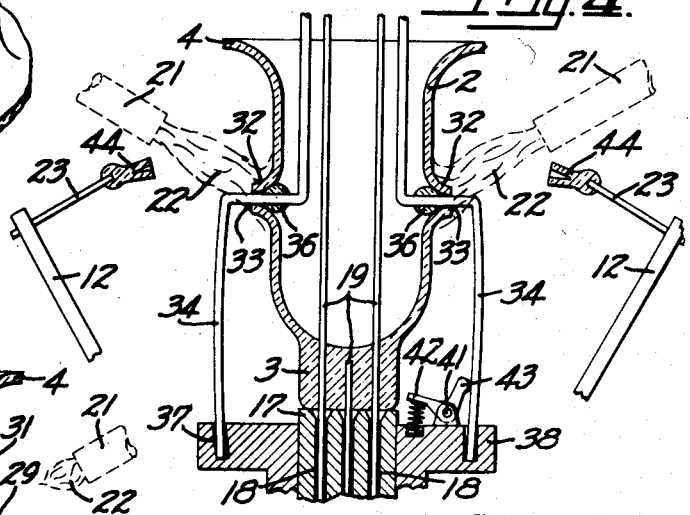
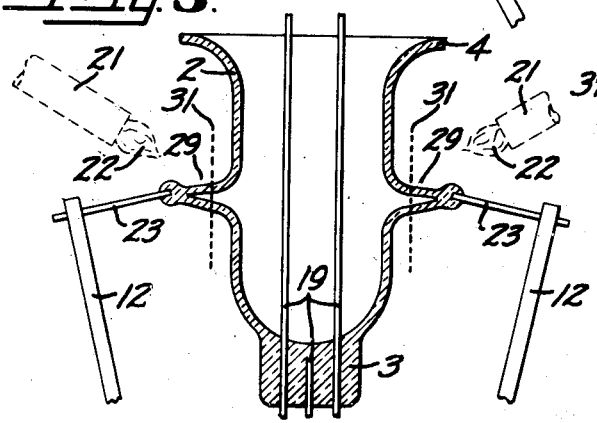
INVENTORS,
WILLIAM W. EITEL.
JACK McCULLOUGH.
BY Donald K. Lippincott
ATTORNEY Patented May 7, 1935

2,000,560

UNITED STATES PATENT OFFICE 2,000,560

THERMIONIC TUBE STEM MACHINE

William W. Eitel and Jack McCullough, San Bruno, Calif., assignors to Heintz & Kaufman, Ltd., San Francisco, Calif., a corporation of Nevada Application December 11, 1933, Serial No. 701,754

12 Claims. (Cl. 49—2)

Our invention relates to machines for assembling the leads in the stems of thermionic tubes and like devices.

Among the objects of our invention are: to provide the elimination of the greater part of the handwork required in the production of stems; to provide uniformity of the completed stems; to provide faster production of the stems; and to provide a method by which the leads may be located, fitted, and sealed in a single machine.

Other objects of our invention will be apparent or will be specifically pointed out in the description forming a part of this specification, but we do not limit ourselves to the embodiment of the invention herein described, as various forms may be adopted within the scope of the claims.

Referring to the drawing:

Figure 1 is a perspective view of a completely fitted stem.

Figure 2 is a vertical sectional view of our machine in the first step of the process of fitting the stem leads.

Figure 3 is a vertical sectional view of the stem and parts of the machine in the step just prior to forming the lead apertures.

Figure 4 is a vertical sectional view of the stem and parts of the machine in the final step of sealing the leads into the stem.

Broadly, the tube stem machine of our invention comprises a rotatable mandrel adapted to axially position a pinched and flared stem, with the pinch located adjacent the mandrel. Means, preferably a plurality of radially spaced flame jets, are provided for heating the stem intermediate the pinch and the flare; and means, rotatable with the mandrel, are provided for forming a series of circumferentially equally spaced apertures in the heated area. Means are also provided for maintaining a plurality of leads in position passing through the apertures while the edges of the apertures are being fused to the leads.

In certain thermionic devices it is desirable to mount several of the electrode leads, or supporting rods, on the stem in positions remote from the pinch. Such a stem is illustrated in Figure 1 of the drawing, and comprises the stem body 2, provided with the usual pinch 3, and the flare 4. Bent rods 6, which may be electrode leads or supporting rods, are passed through, and sealed into, the stem body as at 7.

The method heretofore employed, in fitting these rods, was to provide suitable apertures in the stem and to position, and seal in, each rod individually. This necessitated repeated heating of the stem which was likely to produce strains and cracks. Stems made by this method possessed little of the uniformity which is so vital for the proper alinement of cooperative elements in thermionic devices.

We have provided a machine in which a plurality of apertures may be simultaneously located and formed in a stem; and the leads simultaneously positioned and sealed in. This permits the heating of the stem for a minimum of time and the danger of distortion thereof is practically eliminated. Production of stems, due to the use of this machine, is materially accelerated and the stems possess a high degree of uniformity.

In greater detail, the preferred embodiment of our invention comprises a rotatable mandrel 8 which may be driven from any suitable power source. A flange 9 is formed on the mandrel and is provided with bosses 11 to which arms 12 are pivotally secured by means of the pins 13. Springs 14, disposed between the arms 12 and a bracket 16 secured to the flange 9, normally urge the arms outwardly from the rotational axis of the mandrel.

Formed as a continuation of the mandrel is a projection 17, provided with a plurality of suitably spaced sockets 18, which serve to position a stem 2 through the medium of the filament support, and leads 19 engaging in the sockets 18. The arrangement of the sockets is such that the stem is maintained with the pinch adjacent the mandrel and in axial alinement therewith.

Means are provided for forming a series of apertures about the stem 2. Disposed about the stem are a plurality of flame jets 21, so positioned that the flames 22 are directed against the stem at a point between the pinch and the flare. As the mandrel is rotated the flames cause a uniform heating of a circumferential area about the stem.

Each of the arms 12 is provided, adjacent its end, with a tungsten wire 23, and means are provided for moving these wires into contact with the heated area of the stem. An annular ring 24 is disposed about the mandrel, below the flange 9, and is positioned to underlie headed pins 26, suitably guided in apertures 27 formed in the flange, which contact levers 28 formed integrally with the arms 12. Upward movement of the ring, which may be operated by any of several familiar arrangements of foot treadle, causes the arms to swing inwardly toward the stem.

Tungsten possesses the property of adhering to heated boro-silicate glass. It is this property which is utilized in the formation of the apertures. Referring to Figure 3, it will be observed that the ends of the wires 23 have contacted and adhered to the side wall of the stem, and, by relaxation of the pressure on the foot treadle, the arms are allowed to move outwardly thereby drawing projections 29 from the wall. The flames 22 are now diminished to allow a slight cooling of the glass. Insertion of a suitable metallic instrument into the path of the revolving projections will cause them to break off at a point closely adjacent the dotted line 31, thereby forming, of each projection, a truncated conical protuberance 32 having a central aperture 33.

Means are provided for sealing leads, or support rods, into these apertures. After the formation thereof, as described above, the mandrel is stopped and a pre-formed rod 34, having a bead of glass 36 fused thereto, is placed in each aperture so that the bead lies inside the stem and closely adjacent the aperture. Positioning means for the rods are provided and comprise a series of circumferentially spaced sockets 37, adapted to receive the ends of the rods 34, formed in a flange 38 adjustably positioned on the mandrel projection 17 by means of the set screw 39. It will be noted that the rods 34 shown in Figure 4 are shorter and have a different configuration than those shown in Figure 1. This was done to conserve space in the drawing; it being understood that, by replacing the flange 38, the spacing or positioning of rods of different shapes may be accomplished.

While not essential, it is desirable to have a portion of the rods 34 deflected outwardly to insure that the beads 36 will fuse with the glass about the apertures. This may be accomplished in several ways; two of which are illustrated in Figure 4. At the left of the figure the socket 37 is shown as being bored at an angle with the axis of the mandrel so as to slightly bow the lower portion of the rod; and at the right is shown means for accomplishing this deflection in conjunction with sockets bored parallel with the mandrel axis. A bell crank, suitably pivoted to the flange 38, by means of the pin 41, is provided with a spring pressed arm 42 and an arm 43 adapted to bear against the rod 34 at a point above the face of the flange 38. The spring is sufficiently strong to cause the desired bowing of the rod.

After the rods have been properly positioned the mandrel is again rotated and the flames 22 directed against the stem. As the glass becomes softened, the stressed rods 34 tend to straighten, with the result that the beads 36 are forced outwardly to insure complete circumferential contact between the beads and the glass about the apertures. After fusion of the beads and the stem wall, and allowing sufficient time for the stem to cool, it may be removed from the mandrel, an unfitted stem substituted therefor, and the cycle of operations again repeated. Before work on the new stem is started, the waste projection tips 44 may be crushed with pliers, or any other suitable instrument, to remove them from the ends of the wires 23.

From the foregoing it will be seen that the machine of our invention is capable of producing stems in which the likelihood of strain and cracking is reduced to a minimum and which are possessed of a high degree of uniformity. The simultaneous forming of the apertures, the ease with which the rods may be positioned, and the uniform heating of a circumferential area about the stem to effect the simultaneous sealing in of the rods, provides a more efficient method of stem production and one by means of which the production of these parts may be materially accelerated.

We claim:

1. A thermionic tube stem machine comprising a rotating mandrel, adapted to axially position a pinched and flared stem with the pinch adjacent the mandrel, means for heating the stem intermediate the pinch and the flare, means rotating with said mandrel for forming a circumferential series of equally spaced protuberances which may be broken off to provide apertures in the heated area, and means attached to said mandrel for maintaining a plurality of leads in position passing through said apertures while the edges of said apertures are being fused to said leads.

2. A thermionic tube stem machine comprising a rotating mandrel, adapted to axially position a pinched and flared stem with the pinch adjacent the mandrel, means for heating the stem intermediate the pinch and the flare, aperture forming means rotating with said mandrel for contacting the heated area at a series of circumferential equally spaced points, said latter means adapted to seal to the stem wall at the point of contact, means for moving said aperture forming means outwardly away from said wall to form wall projections which may be broken off to form apertures in the stem wall, and means including said heating means for sealing a lead through each of the apertures thus formed.

3. A thermionic tube stem machine comprising a rotating mandrel, adapted to axially position a pinched and flared stem with the pinch adjacent the mandrel, means for heating the stem intermediate the pinch and the flare, aperture forming means rotating with said mandrel for contacting the heated area at a series of circumferential equally spaced points, said latter means adapted to seal to the stem wall at the point of contact, means for moving said aperture forming means outwardly away from said wall to form wall projections which may be broken off to form apertures in the stem wall, and means for maintaining a beaded lead in position passing through each of said apertures with the bead partially entering the aperture on the inside of said stem while heat is applied to the stem to seal said bead to the edges of said aperture.

4. A thermionic tube stem machine comprising a rotating mandrel, adapted to axially position a pinched and flared stem with the pinch adjacent the mandrel, means for heating the stem intermediate the pinch and the flare, aperture forming means rotating with said mandrel for contacting the heated area at a series of circumferential equally spaced points, said latter means adapted to seal to the stem wall at the point of contact, means for moving said aperture forming means outwardly away from said wall to form wall projections which may be broken off to form apertures in the stem wall, means for maintaining a beaded lead in position passing through each of said apertures with the bead partially entering the aperture on the inside of said stem, said bead being larger than said aperture, and means for applying pressure to said lead to force said bead further into said aperture when heat is applied to said stem to fuse said bead to the edges of said aperture.

5. A thermionic tube stem machine comprising a rotating mandrel, adapted to axially position a pinched and flared stem with the pinch adjacent the mandrel, means for heating the stem intermediate the pinch and the flare, a plurality of hinged arms rotating with said mandrel, a contact on one end of each arm adapted to contact and seal to the heated portion of said wall when said arm is moved toward said stem, means for moving said arm to a contacting position, means for moving said arm away from said stem after contact and seal have been made, to draw out a projection which may be broken off to form an aperture in said stem wall, and means including said heating means for sealing a lead through the aperture thus formed.

6. A thermionic tube stem machine comprising a rotating mandrel, adapted to axially position a pinched and flared stem with the pinch adjacent the mandrel, means for heating the stem intermediate the pinch and the flare, a plurality of hinged arms rotating with said mandrel a contact on one end of each arm adapted to contact and seal to the heated portion of said wall when said arm is moved toward said stem, means for moving said arm to a contacting position, means for moving said arm away from said stem after contact and seal have been made, to draw out a projection which may be broken off to form an aperture in said stem wall, and means for maintaining a beaded lead in position passing through each of said apertures with the bead partially entering the aperture on the inside of said stem while heat is applied to the stem to seal said bead to the edges of said aperture.

7. A thermionic tube stem machine comprising a rotating mandrel, adapted to axially position a pinched and flared stem with the pinch adjacent the mandrel, means for heating the stem intermediate the pinch and the flare, a plurality of hinged arms rotating with said mandrel a contact on one end of each arm adapted to contact and seal to the heated portion of said wall when said arm is moved toward said stem, means for moving said arm to a contacting position, means for moving said arm away from said stem after contact and seal have been made to draw out a projection which may be broken off to form an aperture in said stem wall, means for maintaining a beaded lead in position passing through each of said apertures with the bead partially entering the aperture on the inside of said stem, said bead being larger than said aperture, and means for applying pressure to said lead to force said bead further into said aperture when heat is applied to said stem to fuse said bead to the edges of said aperture.

8. The method of sealing supports in a flared and pinched stem which comprises heating the wall of said stem intermediate the pinch and the flare, simultaneously forming a circumferential series of protuberances which may be broken off to provide apertures in the heated portion of said wall, and simultaneously sealing leads through said apertures.

9. A thermionic tube machine or the like comprising a rotatable member adapted to position a tubular glass object for rotation therewith, means for heating a circumferential area of said object, means for simultaneously locating and permitting the formation of a series of spaced apertures in said heated area, and means, including said heating means, for simultaneously sealing to said stem objects positioned in said apertures.

10. A thermionic tube machine or the like comprising a rotatable member adapted to position a tubular glass object for rotation therewith, means for heating a circumferential area of said object, means for simultaneously forming a series of spaced protuberances in said heated area which may be broken off during rotation of the object to provide spaced apertures therein, and means, including said heating means, for simultaneously sealing, to said stem, objects positioned in said apertures.

11. A thermionic tube machine or the like comprising a rotatable member adapted to position a tubular glass object for rotation therewith, means for heating a circumferential area of said object, spaced means on said rotatable member for pre-forming areas in the heated area of said object which may be removed during rotation of said member to provide apertures in said object, and means, including said heating means, for simultaneously sealing, to said stem, objects positioned in said apertures.

12. In a thermionic tube stem machine or the like, comprising a rotatable member adapted to position a tubular glass object for rotation therewith, means for heating a circumferential area of said object, and means for operating on said object during rotation thereof to provide a series of spaced apertures therein comprising a plurality of elements for pre-forming removable areas of said heated portion of the stem to provide for formation of the apertures.

WILLIAM W. EITEL.
JACK McCULLOUGH.